United States Patent
Lal et al.

(10) Patent No.: US 10,564,849 B2
(45) Date of Patent: Feb. 18, 2020

(54) DATA COMPRESSION TECHNOLOGIES FOR MICRO MODEL ADVANCED ANALYTICS

(71) Applicant: Bank of America Corporation, Charlotte, NC (US)

(72) Inventors: Saba Lal, Plainsboro, NJ (US); Hemanth Grama Jayakumar, Plainsboro, NJ (US)

(73) Assignee: Bank of America Corporation, Charlotte, NC (US)

( * ) Notice: Subject to any disclaimer, the term of this patent is extended or adjusted under 35 U.S.C. 154(b) by 251 days.

(21) Appl. No.: 15/604,043

(22) Filed: May 24, 2017

(65) Prior Publication Data
US 2018/0343314 A1 Nov. 29, 2018

(51) Int. Cl.
*H04L 29/08* (2006.01)
*G06N 3/08* (2006.01)
*G06F 3/06* (2006.01)

(52) U.S. Cl.
CPC ............ *G06F 3/0608* (2013.01); *G06F 3/064* (2013.01); *G06F 3/067* (2013.01)

(58) Field of Classification Search
None
See application file for complete search history.

(56) References Cited

U.S. PATENT DOCUMENTS

| | | | |
|---|---|---|---|
| 2005/0209876 A1* | 9/2005 | Kennis | G06Q 10/06 726/1 |
| 2006/0236395 A1* | 10/2006 | Barker | G06F 21/552 726/23 |
| 2007/0219992 A1* | 9/2007 | Bollinger | G06F 16/2465 |
| 2010/0057622 A1* | 3/2010 | Faith | G06Q 20/04 705/71 |
| 2012/0209854 A1* | 8/2012 | Ikegami | H01J 49/0036 707/741 |
| 2012/0226560 A1 | 9/2012 | Chang et al. | |

(Continued)

OTHER PUBLICATIONS

Bill Schmarzo, "Data Scientist Lesson: Micro-To-Macro Analytics Modeling", 15 pages, https://www.forbes.com/sites/emc/2013/09/17/408/; printed May 24, 2017, Sep. 17, 2013.

(Continued)

*Primary Examiner* — Natisha D Cox
(74) *Attorney, Agent, or Firm* — Michael A. Springs

(57) ABSTRACT

In certain embodiments, a system comprises a memory operable to maintain a plurality of profiles, an interface operable to receive data comprising a plurality of values, and processing circuitry. The processing circuitry is operable to compress the plurality of values into one or more patterns that summarize information about the plurality of values without storing each of the plurality of values in the one or more patterns. Each pattern is associated with a respective profile of the plurality of profiles based on a relationship between the respective profile and the values used to determine each pattern. The processing circuitry is further operable to determine to apply a rule to a first profile of the plurality of profiles, apply the rule to the one or more patterns associated with the first profile, and communicate a result of applying the rule.

20 Claims, 4 Drawing Sheets

(56) References Cited

U.S. PATENT DOCUMENTS

2014/0244361 A1\* 8/2014 Zhang ................ G06Q 30/0204
                                                        705/7.33
2016/0065620 A1\* 3/2016 Liu .................... H04L 63/1441
                                                        726/1
2018/0276541 A1\* 9/2018 Studnitzer .............. G06Q 40/04

OTHER PUBLICATIONS

Bill Schmarzo, "Data Scientist Lesson: Micro-to-Macro Analytics Modeling", 9 pages, https://infocus.emc.com/william_schmarzo/15180 printed May 24, 2017, Sep. 9, 2013.

\* cited by examiner

Spend Category

| Profile Identifier 22 | Month | Category | # | Mean | +2σ | -2σ |
|---|---|---|---|---|---|---|
| 1 | 01 | Dining | 7 | 8000 | 9000 | 7000 |
| 1 | 02 | Travel | 2 | 1500 | 1750 | 1250 |
| 2 | 02 | Dining | 13 | 7000 | 9000 | 5000 |

Merchant Category

| Profile Identifier 22 | Month | Merchant | # | Mean | +2σ | -2σ |
|---|---|---|---|---|---|---|
| 1 | 07 | A | 2 | 450 | 500 | 400 |
| 1 | 07 | B | 4 | 700 | 800 | 600 |
| 1 | 08 | B | 1 | 1200 | 1400 | 1000 |

Bio Metrics

| Profile Identifier 22 | Month | IP Address | # | AM/PM |
|---|---|---|---|---|
| 1 | 01 | xxx.xxx.xxx.1 | 7 | PM |
| 1 | 01 | xxx.xxx.xxx.2 | 25 | AM |
| 2 | 01 | xxx.xxx.xxx.3 | 13 | AM |

*FIG. 3A*

Cash Outflow

| Profile Identifier 22 | Month | Category | # | Mean | +2σ | -2σ |
|---|---|---|---|---|---|---|
| 1 | 1 | Check | 7 | 750 | 600 | 900 |
| 1 | 1 | ACH | 3 | 300 | 250 | 350 |
| 2 | 1 | Wire | 2 | 2000 | 1600 | 2400 |

Performance

| Profile Identifier 22 | Month | Category | # | Mean | +2σ | -2σ |
|---|---|---|---|---|---|---|
| 1 | 1 | Free Revenue | 9 | 1200 | 10000 | 14000 |
| 1 | 1 | Net New Deposit | 12 | 120000 | 110000 | 130000 |
| 2 | 1 | Commission | 7 | 4000 | 30000 | 50000 |

*FIG. 3B*

US 10,564,849 B2

DATA COMPRESSION TECHNOLOGIES FOR MICRO MODEL ADVANCED ANALYTICS

TECHNICAL FIELD

The present disclosure relates generally to computer networks and, more specifically, certain embodiments relate to data compression techniques for micro model advanced analytics.

BACKGROUND

Networks allow users to access various types of computing resources, which may include hardware resources and/or software resources. Examples of hardware resources include computer networks, servers, memory, and so on. Examples of software resources include applications, services, data, and so on. The computing resources may be shared among a number of users and allocated dynamically on an as-needed basis. As an example, in a cloud-based network, users may connect to a cloud service via the Internet, and the cloud service may dynamically allocate server processing power, memory storage capacity, and/or other resources that may be used to host software from the cloud. The interactions of users with the network may result in the generation of large amounts of data that the computing resources must transfer, process, and/or store. Unfortunately, transferring, processing, and storing large amounts of data may result in inefficient use of the computing resources.

SUMMARY

In certain embodiments, a system comprises a memory operable to maintain a plurality of profiles, an interface operable to receive data comprising a plurality of values, and processing circuitry. The processing circuitry is operable to compress the plurality of values into one or more patterns that summarize information about the plurality of values without storing each of the plurality of values in the one or more patterns. Each pattern is associated with a respective profile of the plurality of profiles based on a relationship between the respective profile and the values used to determine each pattern. The processing circuitry is further operable to determine to apply a rule to a first profile of the plurality of profiles, apply the rule to the one or more patterns associated with the first profile, and communicate a result of applying the rule.

Embodiments of the present disclosure may provide one or more technical advantages. For example, certain embodiments relate to data compression techniques for micro model advanced analytics. The embodiments include systems and methods for compressing data, which may allow for more efficient computer-to-computer transferring of data throughout the network, more efficient processing of data by a digital processing system, and/or more efficient data storage. Certain embodiments may have all, some, or none of these advantages. Other advantages may be apparent to those of ordinary skill in the art.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIGS. 3A-3B illustrate examples of profiles that comprise compressed data, in accordance with certain embodiments of the present disclosure.

DETAILED DESCRIPTION

Figure 1:
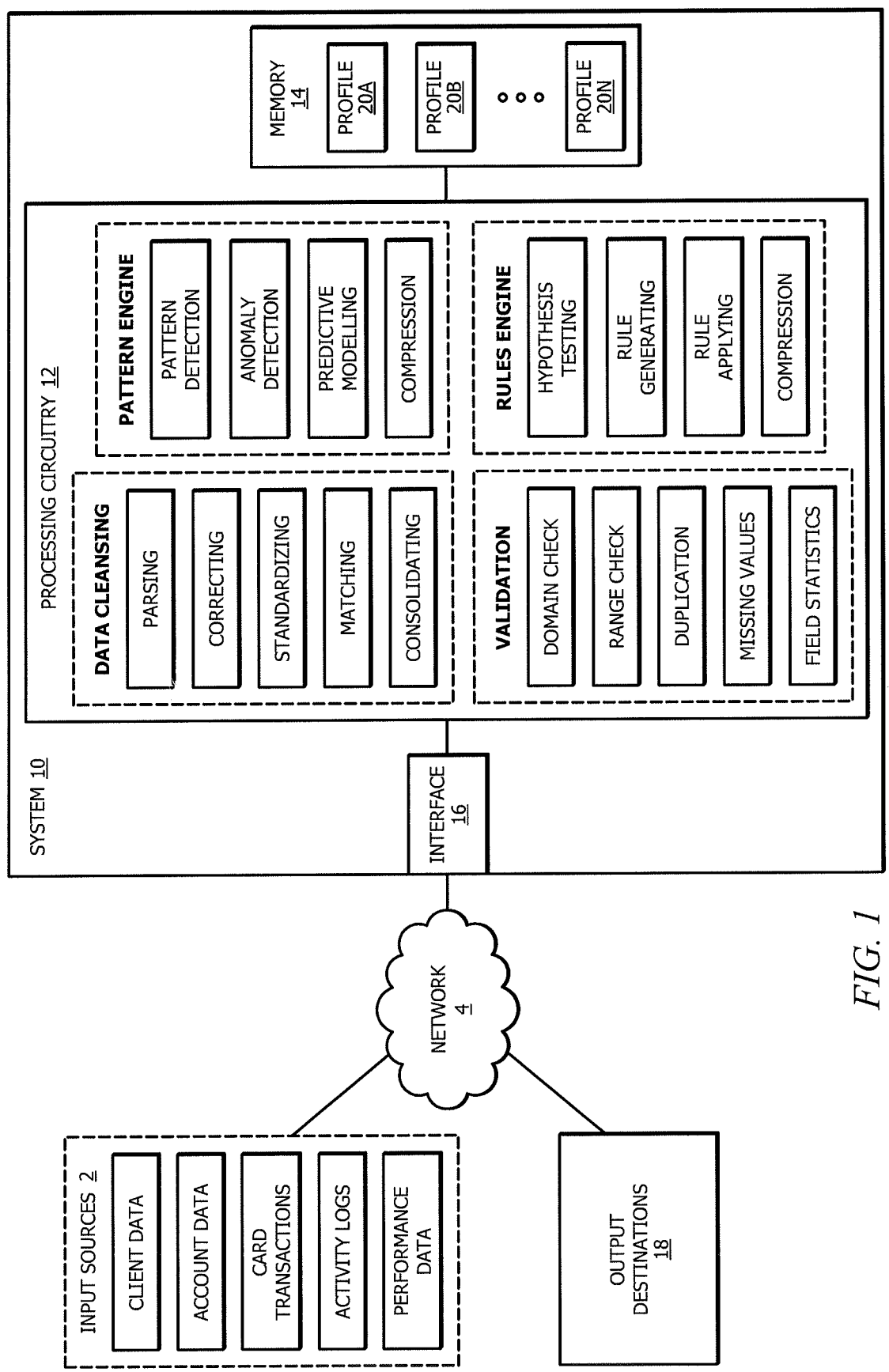
FIG. 1 illustrates an example of a system for performing data compression techniques for micro model advanced analytics, in accordance with certain embodiments of the present disclosure.

Disclosed herein are systems and methods for compressing data. Compressing data may allow for more efficient processing of data. For example, analysis can be applied to the compressed data in order to derive previously unknown correlations. Knowledge of these correlations may enable decision making based on data driven insights. In certain embodiments, the systems and method disclosed herein create micro assets and use the micro assets to generate larger asset intelligence. Thus, patterns for light-weight micro models can be defined for scenario-based advanced analytics. The advanced analytics may include proactive analytics that support learning and feedback. The systems and methods herein may further support model driven analytical reports (e.g., next best action, recommendation), financial and control reports, and routine operational reporting. The inputs and outputs to the system can have any suitable format (e.g., structured data, such as SQL data, or unstructured data).

The systems and methods disclosed herein may provide solutions to problems associated with previous techniques for analyzing data. Historically, companies were limited in the data analytics that could be performed to a shortage of raw data from customers, associates, shareholders, etc. Much of this data would be prepared in a paper format that was not consumable in a manner that would allow it to be used on a wide-scale basis and thus would not allow the application of advanced analytics. Take an automobile for example, each part might generate data, but there was no meaningful way to bring all of that information together to assess safety, performance, etc.

More recently, there has been a trend toward big data. As an example, big data may be in the format of matrices with millions of columns and billions of rows. With the availability of big data, a requirement has emerged for thorough understanding of the data in order to make very specialized decisions. Typically, processing big data requires a skilled data scientist to analyze all of the data, which requires a significant amount of expertise and time (e.g., months or years). By contrast, embodiments disclosed herein may allow for the use of a less costly tool that can efficiently identify correlations from compressed data instead of having to apply analytics to, e.g., the millions of columns and billions of rows of data. In certain embodiments, correlations can be made based on patterns that summarize behavior. Thus, the correlation can be made without having to know which individual pieces of data facilitated the correlation.

As an example, a financial institution could receive transactions from customers that are transacting payments to entities X, X, X, Y, and Z. Rather than analyzing all of the details of the transactions, such as dates, times, account numbers, monetary amounts, spending category, etc., the data could be compressed into patterns indicating the number of payments per entity (e.g., three payments to X, one to Y, and one to Z). If a significant number of customers are sending payments to X and if X is not on a white list (e.g., X is not a credit card company, an electric company, or other entity that typically receives a large volume of payments), then X can be flagged so that the financial institution can investigate the possibility that X is conducting some type of fraud, such as a phishing scam.

Additionally examples are discussed below with respect to FIGS. 1-3, wherein like numerals are used to indicate like and corresponding portions of the figures.

FIG. 1 illustrates an example of a system 10 for performing data compression techniques for micro model advanced analytics, in accordance with certain embodiments of the present disclosure. System 10 includes processing circuitry (e.g., which can include one or more processor(s) 12), memory 14, and interface(s) 16. In general, processing circuitry 12 controls the operation and administration of system 10 by processing information received from memory 14 and/or interface 16. Memory 14 stores, either permanently or temporarily, data or other information compressed by processing circuitry 12. Interface 16 receives input, sends output, processes the input and/or output and/or performs other suitable operations. An interface 16 may comprise hardware and/or software.

Interface 16 connects system 10 to a network 4. Network 4 may facilitate communication between system 10 and one or more input sources 2 and/or output destinations 18. Examples of input sources 2 include sources of client data, account data, card transactions, activity logs, performance data, and/or other computing resources. Examples of output destinations 18 may include downstream computing resources (e.g., system 10 may determine whether to block or allow a transaction, and downstream resources may be configured to perform the transactions allowed by system 10). Other examples of output destinations 18 may include a mobile phone, smart phone, tablet, laptop, personal computer, handheld device, or other device to which system 10 communicates reports or notifications for display to a user of system 10 (such as an employee of company A responsible for operating system 10) or other person (such as a customer of company A).

System 10 may refer to any suitable hardware and/or software configured to perform the described functionality, such as a server (e.g., network server, remote server, web server, or file server, etc.), a mainframe, a host computer, a workstation, a personal computer, or any other suitable device. Components of system 10 may be implemented using shared hardware or separate hardware. In certain embodiments, components of system 10 may be distributed in a cloud network environment. Although FIG. 1 illustrates system 10 as separate from inputs 2 and outputs 18, in other embodiments system 10 (or components thereof) could share hardware used to run applications of input 2 or output 18.

Examples of interfaces 16 include user interfaces and network interfaces. Examples of user interfaces include one or more graphical user interfaces (GUIs), displays, buttons, printers, microphones, speakers, cameras, scanners, credit card readers, check readers, and so on. Network interfaces receive information from or transmit information through a network (e.g., network 4), perform processing of information, communicate with other devices, or any combination of the preceding. Network interfaces may comprise any port or connection, real or virtual, wired or wireless, including any suitable hardware and/or software, including protocol conversion and data processing capabilities, to communicate through a LAN, WAN, or other communication system that allows processing circuitry 12 to exchange information with or through a network.

Processing circuitry 12 communicatively couples to interface(s) 16 and memory 14, and includes any hardware and/or software that operates to control and process information. Processing circuitry 12 may include a programmable logic device, a microcontroller, a microprocessor, any suitable processing device, or any suitable combination of the preceding. Processing circuitry 12 may execute logic stored in memory 14. The logic is configured to perform functionality described herein. In certain embodiments, the logic is configured to perform the method described below with respect to FIG. 2.

In certain embodiments, the logic executed by processing circuitry 12 may include a data cleansing engine, a validation engine, a pattern engine, and/or a rules engine. Data cleansing engine and validation engine receive data comprising a plurality of values and prepare the data to be processed by pattern engine. For example, data cleansing engine may parse the data, identify errors and make corrections, format the data according to a standardized format, and perform matching and consolidation. Validation engine may check the domain and range of the data, check for duplicate values and missing values, and apply field statistics. Pattern engine may compress the plurality of values into one or more patterns and associate each pattern with a respective profile. Rules engine may apply rules to the patterns and communicate a result of applying the rule. To make efficient use of processing circuitry 12, the rules need not be applied to the voluminous underlying data used to determine the pattern. In certain embodiments, the rules engine may include a hypothesis testing module operable to generate and test hypotheses to determine whether a correlation exists between a set of factors and an outcome. In certain embodiments, the rules engine may further include a rule generating module that can generate rules, for example, in response to the hypothesis testing module detecting a correlation between a set of factors and an outcome.

Memory 14 includes any one or a combination of volatile or non-volatile local or remote devices suitable for storing information. For example, memory may include Read Only Memory ("ROM"), Random Access Memory ("RAM"), magnetic storage devices, optical storage devices, or any other suitable information storage device or a combination of these devices. Memory 14 may be local/integrated with the hardware used by processing circuitry 12 and/or remote/external to the hardware used by processing circuitry 12. Memory may include any suitable logic. Logic generally refers to rules, algorithms, code, tables, and/or other suitable instructions embodied in a non-transitory, computer-readable storage medium for performing the described functions and operations when executed by a processing circuitry 12. In certain embodiments, memory 14 may store a plurality of profiles 20a-n. Each profile may be associated with one or more patterns (e.g., patterns determined by the pattern engine). As an example, each profile 20 could be used to store information about a respective customer, and the pattern(s) may indicate habits of the customer associated with that particular profile 20. To make efficient use of memory 14, the stored pattern need not include the details of the voluminous underlying data used to determine the pattern.

Input sources 2, network 4, system 10, and output destinations 18 may each comprise any suitable hardware and/or software, such as any processing circuitry (e.g., which may comprise one or more processors), memory, and/or interfaces required to perform the described functionality. Network 4 represents any suitable network(s) operable to facilitate communication between system 10, input sources 2, and output destinations 18. Network 4 may include any interconnecting system capable of transmitting audio, video, signals, data, messages, or any combination of the preceding. Network 4 may include all or a portion of a public switched telephone network (PSTN), a cellular network, a base station, a gateway, a public or private data network, a LAN, a MAN, a WAN, a WWAN, a local, regional, or global communication or computer network, such as the Internet, a wireline or wireless network, an enterprise intranet, or any other suitable communication link, including combinations thereof, operable to facilitate communication between the components.

For purposes of example and explanation, FIG. 1 depicts the network as including certain components. However, this disclosure recognizes that the network may include any suitable components. One of ordinary skill in the art will appreciate that certain components can be omitted and other components not mentioned herein can be added.

Figure 2:
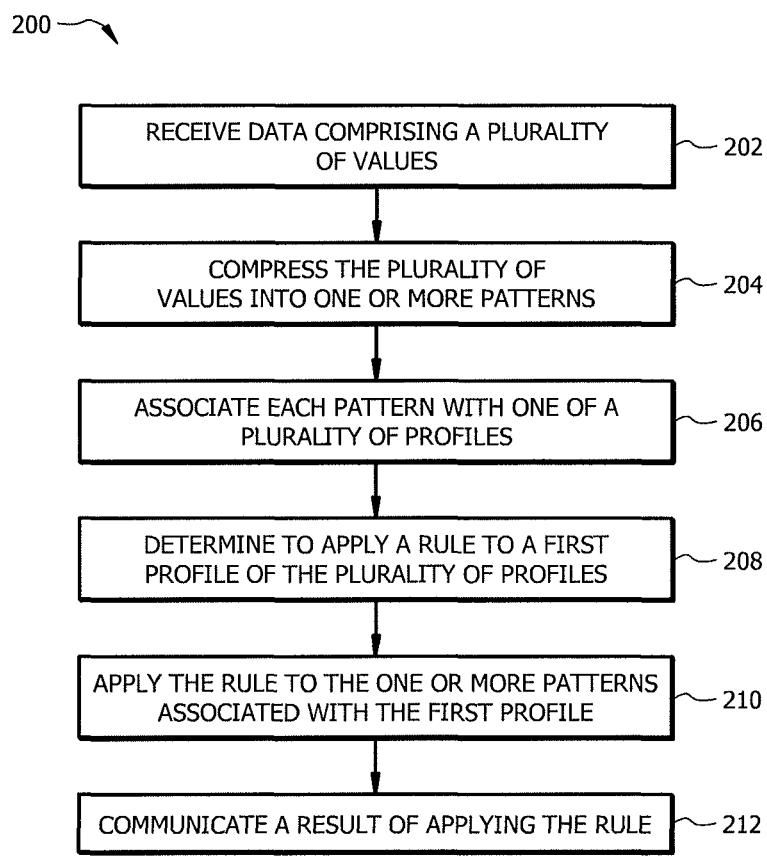
FIG. 2 illustrates an example of a method for performing data compression techniques for micro model advanced analytics, in accordance with certain embodiments of the present disclosure.

FIG. 2 illustrates an example of a method 200 for performing data compression techniques for micro model advanced analytics, in accordance with certain embodiments of the present disclosure. In certain embodiments, the steps of method 200 may be performed by system 10 described above with respect to FIG. 1. For purposes of explanation, the following description provides examples in which system 10 is configured for use by a financial institution, such as a bank that provides customers with one or more services, such as savings accounts, checking accounts, card accounts, online banking, loan services, etc. However, other embodiments of system 10 could be adapted for use by other types of businesses, such as schools, hospitals, retailers, cloud service providers, internet search engines, social networking services, consulting services, and so on. Similarly, the following description provides examples in which system 10 processes customer data. However, other embodiments of system 10 could be adapted to process other types of data. As one example, a company could use system 10 to process employee data to determine factors that contribute to employee attrition.

Method 200 begins at step 202 by receiving data comprising a plurality of values. In certain embodiments, the data may be received by interface 16 of system 10. Interface 16 may be configured to receive the data from one or more input sources 2. Examples of data that may be received at step 202 include client data, account data, card transactions, activity logs, performance data, and/or other suitable data. Client data may include information provided by a customer, such as information about the customer's preferences, spending habits or spending restrictions (e.g., based on location, merchant category, monetary amount, etc.), or other suitable information. As an example, a customer could fill out a form, survey, or questionnaire to provide client data. Account data may include information about financial accounts, such as information pertaining to deposits, withdrawals, or current balances. Card transactions may include information about financial transactions performed using a credit card, debit card, or other card. Examples of transaction information include the date and/or time of the transaction, the monetary value, the merchant, the spend category (e.g., travel, dining, etc.), and so on. Activity logs may include information about online or mobile banking activities, such as date and/or time of the activity, type of activity, device type (e.g., computer or phone), device address (e.g., IP address), money inflows and ouflows, money inflows and outflows through channels such as ACH, Wire, Checks outflows, and so on. Performance data may include Financial Advisor's performance at a client or household level.

In certain embodiments, the received data can be associated with one or more customers. As an example, the received data could include a listing of credit or debit card transactions performed by a number of customers during a time period. Examples of a customer can include an individual, a family whose members share an account, a corporation having a number of accounts for its employees, or other enterprise.

Interface 16 provides the received data to processing circuitry 12. At step 204, the method compresses the plurality of values into one or more patterns. The one or more patterns summarize information about the plurality of values without storing each of the plurality of values in the one or more patterns. The pattern may provide mean values, average values, or other summary of the plurality of values. As an example, suppose the plurality of values include the following transactions:

| Transaction | Date | Customer | Card | Category | Monetary Amount |
|---|---|---|---|---|---|
| 1 | Jan. 1 | A | xxxxx-1 | Dining | $10 |
| 2 | Jan. 1 | B | xxxxx-2 | Travel | $50 |
| 3 | Jan. 2 | A | xxxxx-1 | Dining | $8 |
| 4 | Jan. 2 | B | xxxxx-2 | Travel | $60 |
| 5 | Jan. 2 | B | xxxxx-3 | Dining | $25 |
| 6 | Jan. 3 | B | xxxxx-3 | Dining | $20 |
| 7 | Jan. 4 | A | xxxxx-1 | Dining | $12 |
| 8 | Jan. 4 | A | xxxxx-1 | Dining | $20 |
| 9 | Jan. 5 | B | xxxxx-2 | Travel | $100 |
| 10 | Jan. 5 | A | xxxxx-1 | Dining | $10 |
| 11 | Jan. 5 | B | xxxxx-2 | Travel | $40 |
| 12 | Jan. 5 | B | xxxxx-3 | Dining | $30 |
| 13 | Jan. 6 | A | xxxxx-1 | Dining | $6 |

In an embodiment, processing circuitry 12 may compress the plurality of values associated with customer A into a first pattern that summarize customer A's transactions as spending an average of $11 per dining transaction. The first pattern need not store each of the plurality of values used to generate the first pattern. Thus, in the example, the first pattern need not store the details of transactions 1, 3, 7, 8, 10, and 13 in the amounts of $10, $8, $12, $20, $10, and $6, respectively. Rather, processing circuitry 12 may discard these values after compressing them into the first pattern. Alternatively, processing circuitry may facilitate storing the values (e.g., for backup purposes) even though the values are not required for the data analysis/application of rules discussed below.

Processing circuitry 12 may compress the plurality of values associated with customer B into one or more patterns, such as a pattern that summarizes customer B's transactions as spending an average of $25 per dining transaction, a pattern that summarizes customer B's transactions as spending an average of $62.50 per travel transaction, and/or a pattern that summarizes customer B's overall transactions as spending an average $46.43 per transaction. Processing circuitry 12 may identify other suitable patterns, for example, that customer B typically uses card xxxxx-2 for travel and card xxxxx-3 for dining. The patterns need not store each of the plurality of values (such as the details of transactions 2, 4, 5, 6, 9, 11, 12) used to generate the patterns.

The patterns can be established for any suitable time period or time periods. For example, patterns can be established for a customer's spending habits on a monthly basis and on a seasonal basis (e.g., in case the customer tends to spend more during the holidays or less during tax season). The patterns can be updated on a rolling basis in response to receiving new data.

At step 206, processing circuitry 12 associates each pattern with at least one of a plurality of profiles based on a relationship between the respective profile and the values used to determine the particular pattern. For example, system 10 may maintain a profile 20A for customer A, and system 10 may maintain a profile 20B for customer B. Processing circuitry 12 may associate the first pattern with profile 20A because, as discussed above, the first pattern summarizes customer A's transactions. Similarly, processing circuitry may associate the pattern(s) summarizing customer B's transactions with profile 20B. Processing circuitry 12 may facilitate storing profiles 20A and 20B in memory 14. Memory 14 may refer to any suitable memory, such as internal memory of an apparatus executing processing circuitry 12 or external memory (such as a remote database).

At step 208, processing circuitry 12 determines to apply a rule to a first profile of the plurality of profiles and at step 210, processing circuitry 12 applies the rule to the one or more patterns associated with the first profile. In an embodiment, processing circuitry 12 determines to apply a rule to profile 20A in response to receiving a pending transaction of customer A. The rule compares the received transaction to the one or more patterns associated with profile 20A and determines whether the transaction is consistent with the one or more patterns associated with profile 20A.

Any suitable technique may be used for determining whether the transaction is consistent with the patterns. As an example, if the received transaction is for a dining expenditure of $500, processing circuitry 12 may determine that the transaction is inconsistent with the pattern associated with profile 20A because $500 is significantly higher than customer A's pattern of spending an average of $11 per dining transaction. In an embodiment, the transaction may be determined to be inconsistent with the pattern if the monetary amount of the transaction exceeds a threshold determined based on the pattern. The threshold may be determined statistically (e.g., the threshold may be based on a standard deviation). Although the preceding example uses monetary value to determine whether the transaction is consistent with the patterns, additional or different factors could be used, such as whether the geographical location, time of day, spending category, and/or other factors are consistent with the patterns associated with customer A.

Processing circuitry 12 allows or blocks the transaction depending on whether the transaction is consistent with the one or more patterns associated with profile 20A. In the example described above, processing circuitry 12 would block the $500 transaction because it is not consistent with customer A's pattern of spending an average of $11 per dining transaction.

At step 212, processing circuitry 12 communicates a result of applying the rule. Continuing with the previous example, processing circuitry 12 may inform customer A and/or a bank employee that the $500 transaction was blocked. The information may be used for fraud detection and prevention purposes. In certain embodiments, the communication may enable customer A to authorize the transaction by providing further authentication information (such as a password or other confirmation that the transaction was truly initiated by customer A). Thus, in certain embodiments, customer A may override the rule and allow the transaction to proceed.

As another example, if at step 210 processing circuitry had determined to allow the transaction (e.g., if the transaction had been for $10, which is consistent with customer A's pattern of spending), at step 212 processing circuitry could communicate the result of applying the rule by informing downstream processes to proceed with posting the transaction.

The rule applied in step 210 may be generated in any suitable manner. As an example, the rule may be configured by a user of system 10, such as a bank employee. As another example, the rule may be generated based on data analysis. The data analysis may involve receiving a hypothesis that a correlation exists between a set of factors and an outcome. In an embodiment, an initial hypothesis may be received from an administrator of system 10. For purposes of example, suppose the hypothesis is that a correlation exists between the factor of a customer being located more than 100 miles from home and the outcome of the customer spending X % more than average in the dining category. The method would apply the hypothesis to the patterns associated with one or more of the plurality of profiles and determine a confidence level that the correlation exists. The profiles to which the hypothesis is applied could include all of the profiles (e.g., to identify general trends), a subset of profiles (e.g., to identify trends with particular types of customers, such as corporate customers or individual customers), or a particular customer's profile (e.g., to identify habits of that particular customer).

Continuing with the example, suppose the confidence level indicates that there is a 10% likelihood that a customer spends X % more than average in the dining category when the customer is located more than 100 miles from home. In certain embodiments, the confidence level is compared to a pre-determined threshold to determine whether the hypothesis passes or fails. Suppose the pre-determined threshold is 80%. In this case, the method would determine that the confidence level of 10% fails to satisfy the pre-determined threshold of 80%. That is, there is insufficient evidence that a correlation exists between the factor of a customer being located more than 100 miles from home and the outcome of the customer spending X % more than average in the dining category, so that hypothesis fails.

In response to a determination that that the confidence level associated with the hypothesis fails to satisfy a pre-determined threshold, certain embodiments automatically adapt the hypothesis until the confidence level satisfies the pre-determined threshold. Automatically adapting the hypothesis comprises updating the set of factors by adding and/or removing factors and updating the confidence level based on the updated set of factors. Continuing with the previous example, the method may update the factors by adding a factor indicating that the hypothesis applies to transactions occurring between 6:00 AM and 10:00 AM. The updated confidence level may indicate that there is an 85% likelihood that a customer spends X % more than average in the dining category between 6:00 AM and 10:00 AM when the customer is located more than 100 miles from home. Thus, the confidence level of the updated hypothesis (85%) satisfies the pre-determined threshold (80%).

The method may then report the updated set of factors that result in the confidence level satisfying the pre-determined threshold. For example, the updated set of factors may be reported to a rule-generating engine or to a user of system 10, such as bank employee that evaluates the correlation between the factors and the outcome. In certain embodiments, the method may generate a rule in response to determining that the confidence level associated with the hypothesis satisfies the pre-determined threshold. In the example discussed above, the rule could provide different thresholds for blocking or allowing dining transactions depending on the time of day and how far the customer is from home.

If in the previous example the updated confidence level had failed to satisfy the pre-determined threshold, the method may continue to automatically adapt the hypothesis by testing various combinations of factors until the confidence level satisfies the pre-determined threshold. In certain embodiments, the method may be configured to stop automatically adapting the hypothesis after trying a pre-determined number of updates or in response to the expiry of a hypothesis-testing timer. That is, the method can include mechanisms to stop automatically adapting the hypothesis without having to wait until the confidence level satisfies the pre-determined threshold, for example, in order to efficiently manage processing resources in the event that a suitable hypothesis is not identified within a certain number of iterations or within a certain time period.

FIGS. 3A-3B illustrate examples of profiles that comprise compressed data, in accordance with certain embodiments of the present disclosure. The compressed data may be arranged into profiles 20. Each profile may be identified by a profile identifier 22. The compressed data may summarize patterns 24 determined from data that may be received from one or more input sources 2.

In the example shown in FIGS. 3A-3B, profiles 20A and 20B are maintained for customers A and B, respectively. Profile 20A is shown as having a profile identifier 22 with a value of 1, and profile 20B is shown as having a profile identifier 22 with a value of 2. Thus, profile 20A is associated with patterns 24a, 24b, 24d, 24e, 24f, 24g, 24h, 24j, 24k, 24m, and 24n, and profile 20B is associated with patterns 24c, 24i, 24l, and 24o.

In the example shown in FIGS. 3A-3B, the profiles include patterns 24a-24c related to a spend category, patterns 24d-24f related to a merchant category, patterns 24g-24i related to bio metrics, patterns 24j-24l related to cash outflow, and patterns 24m-24o related to performance. The patterns summarize input data that was used to generate the pattern without including the input data. In the example, date/time stamps, transaction identifiers, and similar details from the input data need not be included in the pattern.

In the examples, the spend category, merchant category, cash outflow category, and performance category each indicate a time period (e.g., month), a number of transactions per subcategory, a summary of the transactions (e.g., mean), and standard deviation information (e.g., +2$\sigma$ and −2$\sigma$). In certain embodiments, the standard deviation information can be used to detect whether new transactions are consistent with the pattern of the customer. Other embodiments may use different standard deviation information (e.g., ±1 $\sigma$, ±3 $\sigma$, etc.). Examples of subcategories for the spend category include dining and travel. Examples of subcategories for the merchant category include merchant A and merchant B, which may refer to the names of retailers, service providers, etc. Examples of subcategories for the cash outflow category include check, Automated Clearing House (ACH), or wire. Examples of subcategories for the performance category include fee revenue, net new deposit, and commission. Other embodiments may include additional or different categories and/or subcategories.

The bio metrics indicate a time period (e.g., month), an IP address used by the customer, the number of times the customer used the IP address, and whether the use occurred in the morning or the evening. In certain embodiments, the pattern may be used to determine if a new activity is initiated from an unusual IP address or at an unusual time of day for that customer.

Modifications, additions, or omissions may be made to the systems, apparatuses, and methods described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic.

Modifications, additions, or omissions may be made to the methods described herein without departing from the scope of the disclosure. The methods may include more, fewer, or other steps. Additionally, steps may be performed in any suitable order unless explicitly stated otherwise.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure.

The invention claimed is:

1. A system comprising:
a memory operable to store a plurality of profiles, including at least a first profile associated with a first entity and a second profile associated with a second entity;
an interface operable to receive data comprising a plurality of values, including at least a first subset of values associated with the first entity and a second subset of values associated with the second entity; and
processing circuitry operable to:
compress the first subset of values into a first pattern, wherein the first pattern summarizes information about the first subset of values without storing each of the first subset of values in the first pattern;
compress the second subset of values into a second pattern, wherein the second pattern summarizes information about the second subset of values without storing each of the second subset of values in the second pattern;
associate the first pattern with the first profile based on a relationship between the first profile and the first subset of values;
determine to apply a rule to the first profile;
apply the rule to the first pattern associated with the first profile; and
communicate a result of applying the rule.

2. The system of claim 1, wherein the rule is applied in response to receiving a transaction associated with the first profile and the rule comprises:
comparing the transaction to the first pattern;
determining whether the transaction is consistent with the first pattern; and
allowing or blocking the transaction depending on whether the transaction is consistent with the first pattern.

3. The system of claim 1, wherein the processing circuitry is further operable to:
receive a hypothesis that a correlation exists between a set of factors and an outcome; and
determine a confidence level that the correlation exists between the set of factors and the outcome based on applying the hypothesis to the first and second patterns.

4. The system of claim 3, wherein in response to a determination that the confidence level associated with the hypothesis fails to satisfy a pre-determined threshold, the processing circuitry is further operable to automatically adapt the hypothesis until the confidence level satisfies the pre-determined threshold, wherein automatically adapting the hypothesis comprises:
updating the set of factors by adding and/or removing factors;
updating the confidence level based on the updated set of factors; and
reporting the updated set of factors that result in the confidence level satisfying the pre-determined threshold.

5. The system of claim 4, the processing circuitry further operable to stop automatically adapting the hypothesis after trying a pre-determined number of updates or in response to the expiry of a hypothesis-testing timer.

6. The system of claim 3, wherein the confidence level associated with the hypothesis satisfies a pre-determined threshold and the rule applied to the first profile is generated based on the hypothesis.

7. The system of claim 1, wherein the processing circuitry is further operable to discard the first subset of values after compressing the first subset of values into the first pattern.

8. A method, comprising:
storing a plurality of profiles, including at least a first profile associated with a first entity and a second profile associated with a second entity;
receiving data comprising a plurality of values, including at least a first subset of values associated with the first entity and a second subset of values associated with the second entity;
compressing the first subset of values into a first pattern, wherein the first pattern summarizes information about the first subset of values without storing each of the first subset of values in the first pattern;
compressing the second subset of values into a second pattern, wherein the second pattern summarizes information about the second subset of values without storing each of the second subset of values in the second pattern;
associating the first pattern with the first profile based on a relationship between the first profile and the first subset of values;
determining to apply a rule to the first profile;
applying the rule to the first pattern associated with the first profile; and
communicating a result of applying the rule.

9. The method of claim 8, wherein the rule is applied in response to receiving a transaction associated with the first profile and the rule comprises:
comparing the transaction to the first pattern;
determining whether the transaction is consistent with the first pattern; and
allowing or blocking the transaction depending on whether the transaction is consistent with the first pattern.

10. The method of claim 8, further comprising:
receiving a hypothesis that a correlation exists between a set of factors and an outcome; and
determining a confidence level that the correlation exists between the set of factors and the outcome based on applying the hypothesis to the first and second patterns.

11. The method of claim 10, wherein in response to a determination that the confidence level associated with the hypothesis fails to satisfy a pre-determined threshold, the method automatically adapts the hypothesis until the confidence level satisfies the pre-determined threshold, wherein automatically adapting the hypothesis comprises:
updating the set of factors by adding and/or removing factors;
updating the confidence level based on the updated set of factors; and
reporting the updated set of factors that result in the confidence level satisfying the pre-determined threshold.

12. The method of claim 11, further comprising stopping the automatically adapting of the hypothesis after trying a pre-determined number of updates or in response to the expiry of a hypothesis-testing timer.

13. The method of claim 10, wherein the confidence level associated with the hypothesis satisfies a pre-determined threshold and the rule applied to the first profile is generated based on the hypothesis.

14. A non-transitory computer readable medium comprising logic that, when executed by processing circuitry, is operable to:
store a plurality of profiles, including at least a first profile associated with a first entity and a second profile associated with a second entity;
receive data comprising a plurality of values, including a first subset of values associated with the first entity and a second subset of values associated with the second entity;
compress the first subset of values into a first pattern, wherein the first pattern summarizes information about the first subset of values without storing each of the first subset of values in the first pattern;
compress the second subset of values into a second pattern, wherein the second pattern summarizes information about the second subset of values without storing each of the second subset of values in the second pattern;
associate the first pattern with the first profile based on a relationship between the first profile and the first subset of values;
determine to apply a rule to the first profile;
apply the rule to the first pattern associated with the first profile; and
communicate a result of applying the rule.

15. The non-transitory computer readable medium of claim 14, wherein the rule is applied in response to receiving a transaction associated with the first profile and the rule comprises:
comparing the transaction to the first pattern;
determining whether the transaction is consistent with the first pattern; and
allowing or blocking the transaction depending on whether the transaction is consistent with the first pattern.

16. The non-transitory computer readable medium of claim 14, the logic further operable to:
receive a hypothesis that a correlation exists between a set of factors and an outcome; and
determine a confidence level that the correlation exists between the set of factors and the outcome based on applying the hypothesis to the first and second patterns.

17. The non-transitory computer readable medium of claim 16, wherein in response to a determination that the confidence level associated with the hypothesis fails to satisfy a pre-determined threshold, the logic is further operable to automatically adapt the hypothesis until the confidence level satisfies the pre-determined threshold, wherein automatically adapting the hypothesis comprises:
- updating the set of factors by adding and/or removing factors;
- updating the confidence level based on the updated set of factors; and
- reporting the updated set of factors that result in the confidence level satisfying the pre-determined threshold.

18. The non-transitory computer readable medium of claim 17, the logic further operable to stop the automatically adapting of the hypothesis after trying a pre-determined number of updates or in response to the expiry of a hypothesis-testing timer.

19. The non-transitory computer readable medium of claim 16, wherein the confidence level associated with the hypothesis satisfies a pre-determined threshold and the rule applied to the first profile is generated based on the hypothesis.

20. The non-transitory computer readable medium of claim 14, wherein the logic is further operable to discard the first subset of values after compressing the first subset of values into the first pattern.

* * * * *